US012803443B2

(12) United States Patent
Hung et al.

(10) Patent No.: US 12,803,443 B2
(45) Date of Patent: Nov. 17, 2026

(54) BUCK CIRCUIT AND CHARGING CONTROLLER AND METHOD USED IN BUCK CIRCUIT

(71) Applicant: NUVOTON TECHNOLOGY CORPORATION, Hsinchu City (TW)

(72) Inventors: Yeh-Tai Hung, Zhubei City (TW); Chung Ming Hsieh, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 188 days.

(21) Appl. No.: 18/791,773

(22) Filed: Aug. 1, 2024

(65) Prior Publication Data

US 2025/0226745 A1 Jul. 10, 2025

(30) Foreign Application Priority Data

Jan. 9, 2024 (TW) ................................ 113100952

(51) Int. Cl.
*H02M 3/158* (2006.01)
*H02M 1/08* (2006.01)
*H02M 1/088* (2006.01)

(52) U.S. Cl.
CPC ........... *H02M 3/158* (2013.01); *H02M 1/088* (2013.01)

(58) Field of Classification Search
CPC ........ H02M 1/083; H02M 1/009; H02M 1/08; H02M 3/158
See application file for complete search history.

(56) References Cited

U.S. PATENT DOCUMENTS 9,529,375 B2 * 12/2016 Bayer .................... H02M 3/158
9,698,685 B2 * 7/2017 Calhoun ............... H02M 3/158
2013/0234513 A1 * 9/2013 Bayer ...................... H02M 3/07 307/31
2020/0076298 A1 * 3/2020 Jung ..................... H02M 3/157

FOREIGN PATENT DOCUMENTS

KR 101284976 B1 * 7/2013 ............ H02M 3/155
KR 20230007704 A * 1/2023 ............ H02M 3/158
KR 102812413 B1 * 5/2025 ............ H02M 3/155
WO WO-2024136029 A1 * 6/2024 .......... H02M 1/0067

* cited by examiner

*Primary Examiner* — Sisay G Tiku
(74) *Attorney, Agent, or Firm* — MUNCY, GEISSLER, OLDS & LOWE, P.C.

(57) ABSTRACT

A charge controller for a buck circuit is illustrated. The charge controller compares a reference voltage and multiple feedback voltages of multiple output voltages to generate multiple comparison signals, wherein a pulse-frequency modulation buck module outputs the output voltages at multiple voltage output terminals through a single inductor and multiple switches, and each of the switches is disposed between the single inductor and the corresponding voltage output terminal. Then, the charge controller determines a charging order of the voltage output terminals based on the comparison signals, and is arranged to generate multiple switching signals and a start signal based on a zero-current detection signal of the single inductor and the charging order, wherein the switching signals are arranged to control the switches, and the start signal is arranged to enable the pulse-frequency modulation buck module to charge one of the voltage output terminals.

9 Claims, 8 Drawing Sheets

BUCK CIRCUIT AND CHARGING CONTROLLER AND METHOD USED IN BUCK CIRCUIT

CROSS-REFERENCE TO RELATED APPLICATION

This application claims the priority from the TW patent application Ser. No. 11/310,0952, filed on Jan. 9, 2024, and all contents of such TW Patent Application are comprised in the present disclosure.

BACKGROUND

1. Field of the Invention

The present invention relates to a buck circuit, a charging controller and a method for the buck circuit, and more particularly, to a pulse frequency modulation (PFM) single-inductor multi-output (SIMO) buck circuit, a charging controller and a method for the buck circuit.

2. Description of the Related Art

Conventional buck circuits usually have only one voltage output terminal (and therefore only has single power domain), and output a fixed output voltage from its voltage output terminal for the back-end load. The conventional buck circuits are usually equipped with an inductor at its single voltage output terminal, and this kind of buck circuit adopts pulse-frequency modulation approaches, and thus it is also called SISO buck circuit.

The pulse-frequency modulation inductor single output buck circuit can be used in the situation where the back-end load only requires a specific voltage. However, when the back-end load is a Micro Controller Unit (MCU) or other type of circuits that require a plurality of different specific voltages (i.e., the back-end load requires a multi-power domain buck circuit), the requirements cannot be achieved simply using a single output buck circuit with a pulse-frequency modulation inductor.

In view of this, there is a need in the industry for the pulse-frequency modulation inductor multi-output buck circuit with multiple voltage output terminals to output different output voltages. However, some digital circuits as back-end loads may operate faster and therefore also drain current faster, such as the aforementioned microcontroller unit with faster operation speed, which leads to the fact that the related art pulse-frequency modulation inductor multi-output buck circuit cannot guarantee that the output voltages of multiple voltage output terminals can be stably maintained at an acceptable level in the digital circuits.

SUMMARY

As can be understood from the above description, the technical problem to be solved in the present invention is that the output voltages of a plurality of voltage output terminals of the related art pulse-frequency modulation inductor multi-output buck circuit cannot be stably maintained within the acceptable range of the back-end load due to the fast operation speed of the load.

In order to solve the above-mentioned conventional problems, an embodiment of the present invention provides a charging controller for a buck circuit, which includes a comparison module and a single-inductor multi-output control circuit. The comparison module is arranged to compare a reference voltage, and the pulse-frequency modulation buck output a plurality of feedback voltages of the plurality of output voltages through a single inductor and a plurality of switches of a switching module, in order to generate a plurality of comparison result signals, wherein each of the plurality of switches is arranged between the single inductor and a corresponding voltage output terminal among the plurality of voltage output terminals. The single-inductor multi-output control circuit is electrically connected to the comparison module, and is arranged to determine a charging order of the plurality of voltage output terminals according to the plurality of comparison result signals, and generate a plurality of switching signals for controlling the plurality of switches and a start signal for enabling the pulse-frequency modulation buck module to charge one of the plurality of voltage output terminals according to a zero-current detection signal of the single inductor and the charging order.

In view of the above, the present invention provides a charging controller and method which can charge multiple output voltages of an inductor multi-output buck circuit with pulse-frequency modulation, so that the buck circuit using the charging controller or associated method can stably keep the output voltages of the multiple voltage output terminals of the buck circuit within an acceptable range of the back-end load.

BRIEF DESCRIPTION OF THE DRAWINGS

In order to allow the abovementioned and other purposes, features, advantages and embodiments of the present disclosure to be more clearly understood, the accompanying drawings are described as following.

DESCRIPTION OF THE PREFERRED EMBODIMENTS

The buck circuit of the present invention is modified from the single-inductor and single-output type of the buck circuit in the related art, and the buck circuit with single-inductor and multi-output is realized by additionally setting a comparison module and a single-inductor and multi-output control circuit, while still maintaining a single inductor. The comparison module and the single-inductor multi-output control circuit form the charging controller of the buck circuit, and the charging controller can stably keep the output voltages of the multiple voltage output terminals of the buck circuit within an acceptable range of the back-end load.

The viable embodiments of the present invention will be described in detail below with reference to the drawings. It should be noted that the following implementation details are not meant to limit the patent scope of the present invention, but only for better comprehension of one skilled in the art.

Figure 1:
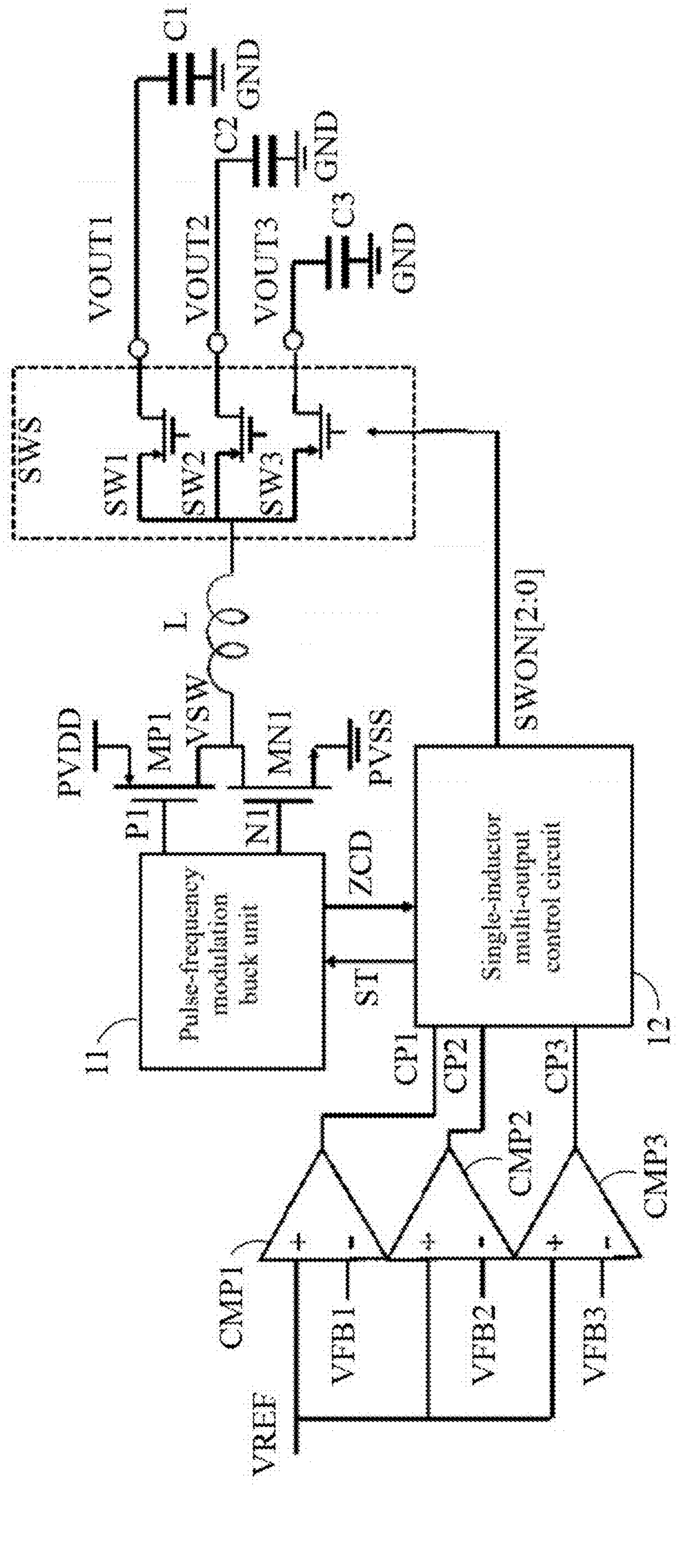
FIG. 1 is a schematic circuit diagram of a buck circuit according to an embodiment of the present invention.

Please refer to FIG. 1. FIG. 1 is a schematic circuit diagram of a buck circuit according to an embodiment of the present invention, where the charging controller of the buck circuit and the pulse-frequency modulation buck module are provided. The charging controller includes a comparison module and a single-inductor multi-output control circuit 12, and comprises a plurality of comparators CMP1-CMP3 this embodiment, but the present invention is not limited thereto. The pulse-frequency modulation buck module comprises an inductor L, a switching module SWS, a pulse-frequency modulation buck unit 11 and a power switch circuit. In this embodiment, the switching module SWS is composed of three switches SW1 to SW3, and the power switch circuit is composed of a PMOS power transistor MP1 and an NMOS power transistor MN1, but the present invention is not limited thereto.

One end of each of the plurality of switches SW1-SW3 is electrically connected to the first end of the single inductor L, the other end of each of the plurality of switches SW1-SW3 is electrically connected to the corresponding voltage output end, and the control end of each of the plurality of switches SW1-SW3 is electrically connected to the single-inductor multi-output control circuit 12 to receive the corresponding switch signal SWON[2:0]. The pulse-frequency modulation buck unit 11 is electrically connected with a single-inductor multi-output control circuit 12, and is used for receiving the start signal ST and outputting the zero-point current detection signal ZCD and the driving signals P1 and N1 when the current of the single inductor L is zero. Further, the plurality of switches SW1-SW3 can be realized by a plurality of PMOS low-power transistors, wherein the gate, source and drain of each PMOS low-power transistor are said control end, said one end and said other end of each of the switches SW1-SW3, respectively.

The gate of the PMOS power transistor MP1 and the gate of the NMOS power transistor MN1 are electrically connected to the pulse-frequency modulation buck unit 11 to receive the driving signals P1 and N1, respectively. The drain of the PMOS power transistor MP1 and the drain of the NMOS power transistor MN1 are electrically connected to each other and further connected to the second end of the single inductor L. The source of the PMOS power transistor MP1 and the source of the NMOS power transistor MN1 are electrically connected to the high voltage PVDD and the low voltage PVDD, respectively. The high voltage PVDD and the low voltage PVSS may be a supply voltage and a ground voltage respectively, but the present invention is not limited thereto.

The buck circuit is an inductor multi-output buck circuit with pulse-frequency modulation, and a plurality of voltage output terminals respectively output the output voltages VOUT1-VOUT3 to back-end loads C1-C3, wherein both ends of each back-end load C1-C3 are electrically connected between a corresponding voltage output terminal and the ground voltage GND, and the back-end loads C1-C3 can be capacitive impedances. The back-end loads C1-C3 may be different electronic components and use different output voltages Vout1-Vout3 as operating voltages or supply voltages, or otherwise the back-end loads C1-C3 may be multiple sub-circuits using different output voltages Vout1-Vout3 as operating voltages or supply voltages in a single electronic component. For example, the buck circuit provides a plurality of different output voltages VOUT1-VOUT3 to the same microcontroller unit. When the electronic components of the back-end loads C1-C3 operate faster or consume power faster, the output voltages Vout1-Vout3 may drop and thus cannot be maintained in an acceptable range. Therefore, the charging controller must charge its voltage output terminals before the output voltages Vout1-Vout3 drop out of an acceptable range.

The comparison module is arranged to compare the reference voltage VREF with a plurality of feedback voltages VFB1-VFB3 of a plurality of output voltages VOUT1-VOUT3 output to a plurality of voltage output terminals through an inductor L and a plurality of switches SW1-SW3 of the switching module SWS, so as to generate a plurality of comparison result signals CP1-CP3. In the embodiment of FIG. 1, a plurality of forward input terminals of a plurality of comparators CMP1-CMP3 receive the reference voltage VREF, and a plurality of reverse input terminals of the plurality of comparators CMP1-CMP3 receive a plurality of feedback voltages VFB1-VFB3 of a plurality of output voltages VOUT1-VOUT3, and the plurality of comparators CMP1-CMP3 respectively output the comparison result signals CP1-CP3.

Note that in other embodiments, the comparison module may only include a comparator, a multiplexer and a demultiplexer, in which a plurality of input terminals received by the multiplexer receive a plurality of feedback voltages VFB1-VFB3, the output terminal of the multiplexer switches to output one of the plurality of feedback voltages VFB1-VFB3 according to the switching frequency, and the forward input terminal of the comparator receives a reference voltage VREF. The reverse input end of the comparator is electrically connected to the output end of the multiplexer, the input end of the demultiplexer is electrically connected to the output end of the comparator, and the demultiplexer is switched according to the switching frequency, so that a plurality of output ends of the demultiplexer respectively output a plurality of comparison result signals CP1-CP3. However, to implement the comparison module in this way must also ensure that the switching time corresponding to the switching frequency is lower than the charging time, so as to effectively prevent the output voltages VOUT1-VOUT3 from falling out of the acceptable range.

In addition, in order to prevent one voltage output terminal from occupying the pulse-frequency modulation buck module for a long time and thus other voltage output terminals cannot be charged, the comparison module can be designed to be able to reset the corresponding one of the comparison result signals CP1-CP3 with a high voltage level after one of the comparison result signals CP1-CP3 maintains the high voltage level for a period of time.

The single-inductor multi-output control circuit 12 is electrically connected with a plurality of comparators CMP1-CMP3 of the comparison module, and is used for determining the charging order of a plurality of voltage output terminals according to a plurality of comparison result signals CP1-CP3, generating a plurality of switching signals SWON[2:0] for controlling a plurality of changeover switches SW1-SW3 according to the zero-point current detection signal ZCD of the single inductor L and the charging order, and enabling the pulse-frequency modulation buck module to control the plurality of voltage output terminals. In addition, the embodiment of FIG. 1 three output voltages VOUT1-VOUT3 are taken as an example of the quantity, but in other embodiments of the prevent invention, the number of output voltages may be two or more than three.

Figure 2:
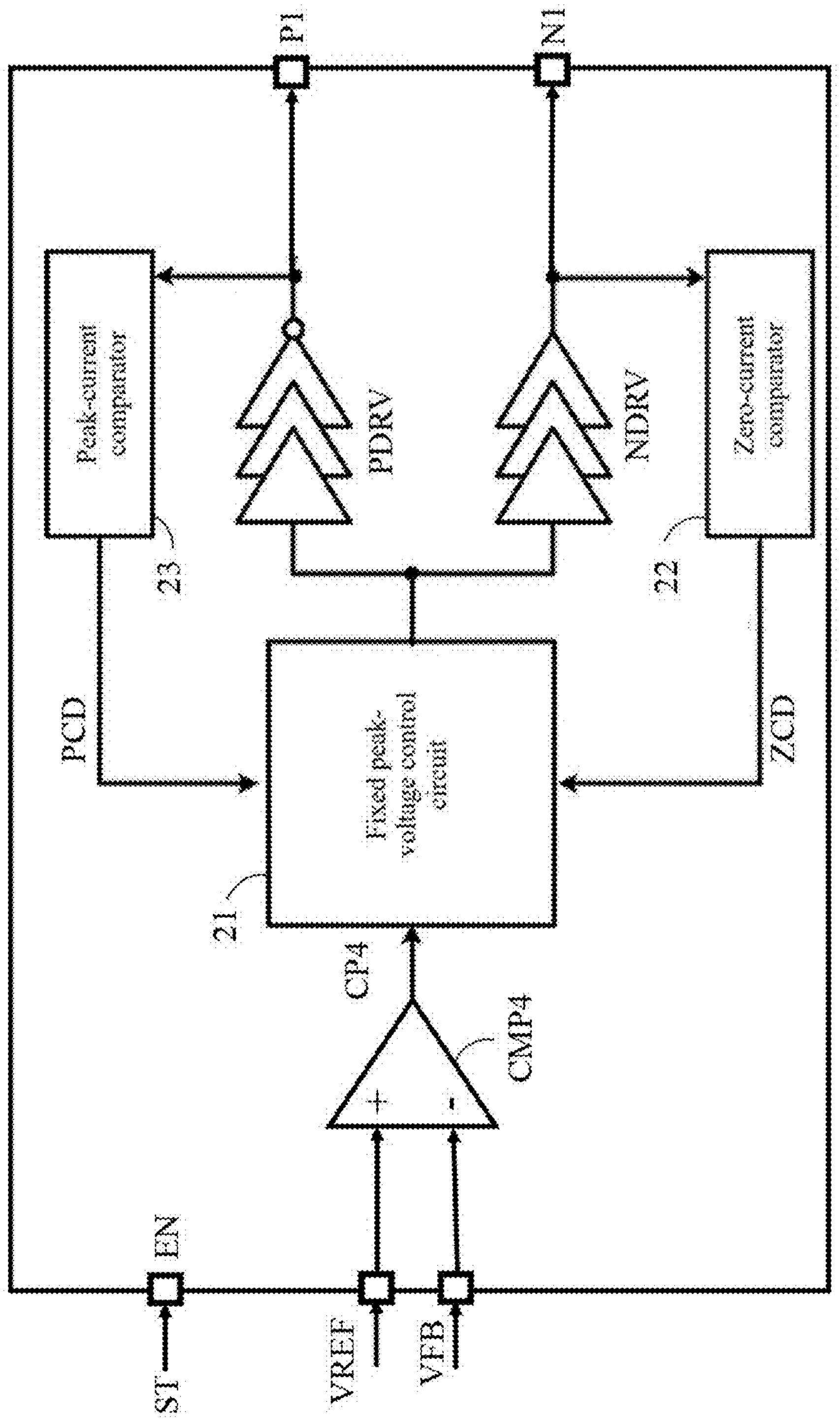
FIG. 2 is a schematic circuit diagram of a pulse-frequency modulation buck unit of a buck circuit according to an embodiment of the present invention.

Please refer to FIG. 1 and FIG. 2. FIG. 2 is a schematic circuit diagram of a pulse-frequency modulation buck unit of a buck circuit according to an embodiment of the present invention. The pulse frequency modulation and buck unit 11 has an enable terminal EN for receiving the start signal ST, and includes a comparator CMP4, a fixed peak-voltage control circuit 21, driving stages PDRV and NDRV, a zero-current comparator 22 and a peak-current comparator 23. The comparator is arranged to compare the feedback voltage VFB with the reference voltage VREF to generate a comparison result signal CP4, wherein the feedback voltage VFB is the voltage at the first end of an inductor L, i.e., one of a plurality of feedback voltages VFB1-VFB3.

The fixed peak-voltage control circuit 21 is electrically connected to the comparator CMP4, and is arranged to generate driving signals to be input to the driving stages PDRV and NDRV according to the zero-current detection signal ZCD and the peak-current detection signal PCD of the single inductor L. The driving stages PDRV and NDRV are electrically connected to the fixed peak-voltage control circuit 21, and are respectively arranged to generate driving signals P1 and N1 according to the driving signals generated by the fixed peak-voltage control circuit 21. The zero-current comparator 22 and the peak-current comparator 23 are electrically connected with the single inductor L and the fixed peak-voltage control circuit 21, and are respectively arranged to detect the current flowing through the single inductor L to generate a zero-current detection signal ZCD and a peak-current detection signal PCD.

Figure 3:
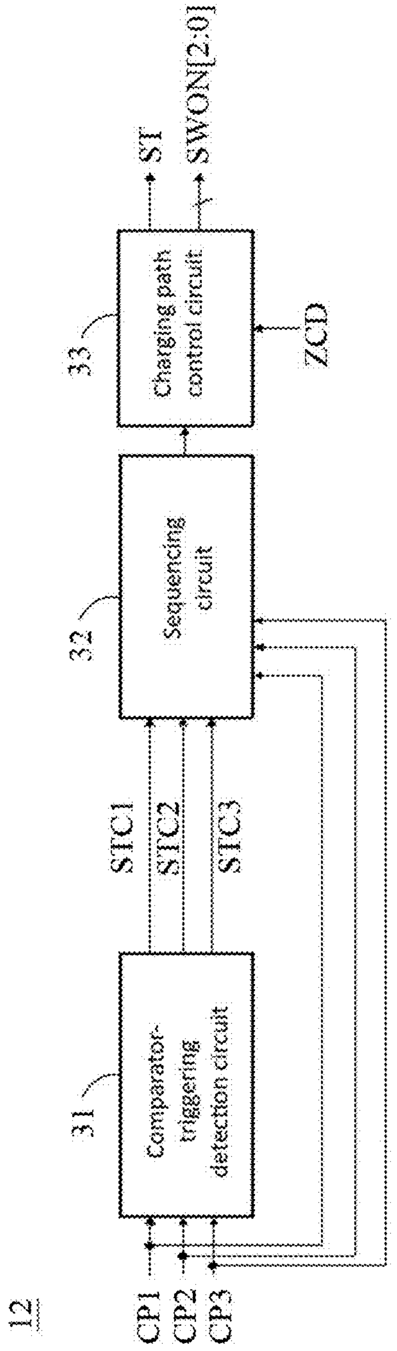
FIG. 3 is a schematic circuit diagram of a single-inductor multi-output control circuit of a charging controller of a buck circuit according to an embodiment of the present invention.

Please refer to FIGS. 1 and 3. FIG. 3 is a schematic circuit diagram of a single-inductor multi-output control circuit of a charging controller of a buck circuit according to an embodiment of the present invention. The single-inductor multi-output control circuit 12 includes a comparator-triggering detection circuit 31, a sequencing circuit 32 and a charging path control circuit 33. The comparator-triggering detection circuit 31 is arranged to generate charging quantity indication signals STC1-STC3 according to comparison result signals CP1-CP3, respectively. The charging quantity indication signals STC1-STC3 are arranged to indicate the number of voltage output terminals to be charged. For example, the charging quantity indication signals STC1-STC3 may respectively indicate that one, two and three voltage output terminals need to be charged. The sequencing circuit 32 is electrically connected to the comparator-triggering detection circuit 31, and is arranged to determine the charging order according to the charging quantity indication signals STC1-STC3 and the comparison result signals CP1-CP3. The charging path control circuit 33 is electrically connected to the sequencing circuit 32, and is arranged to generate a plurality of switching signals SWON[2:0] according to the zero-current detection signal ZCD and the charging order.

Please continue to refer to FIG. 1. According to the above content, the charging controller actually implements a charging control method for the buck circuit, and the charging control method comprises the following steps: comparing a reference voltage VREF with a plurality of feedback voltages VFB1-VFB3 of a plurality of output voltages VOUT1-VOUT3 output to a plurality of voltage output terminals through an inductor L and a plurality of switches SW1-SW3 to generate a plurality of comparison result signals CP1-CP3, wherein each of the plurality of switches SW3 is arranged between the single inductor L and the corresponding voltage output terminals; and determining the charging order of a plurality of voltage output terminals according to a plurality of comparison result signals CP1-CP3, generating a plurality of switching signals SWON[2:0] for controlling a plurality of changeover switches SW1-SW3, and generating a start signal ST for enabling the pulse-frequency modulation buck module to charge one of the plurality of voltage output terminals according to the zero-point current detection signal ZCD of the single inductor L and the charging order.

Figure 4:
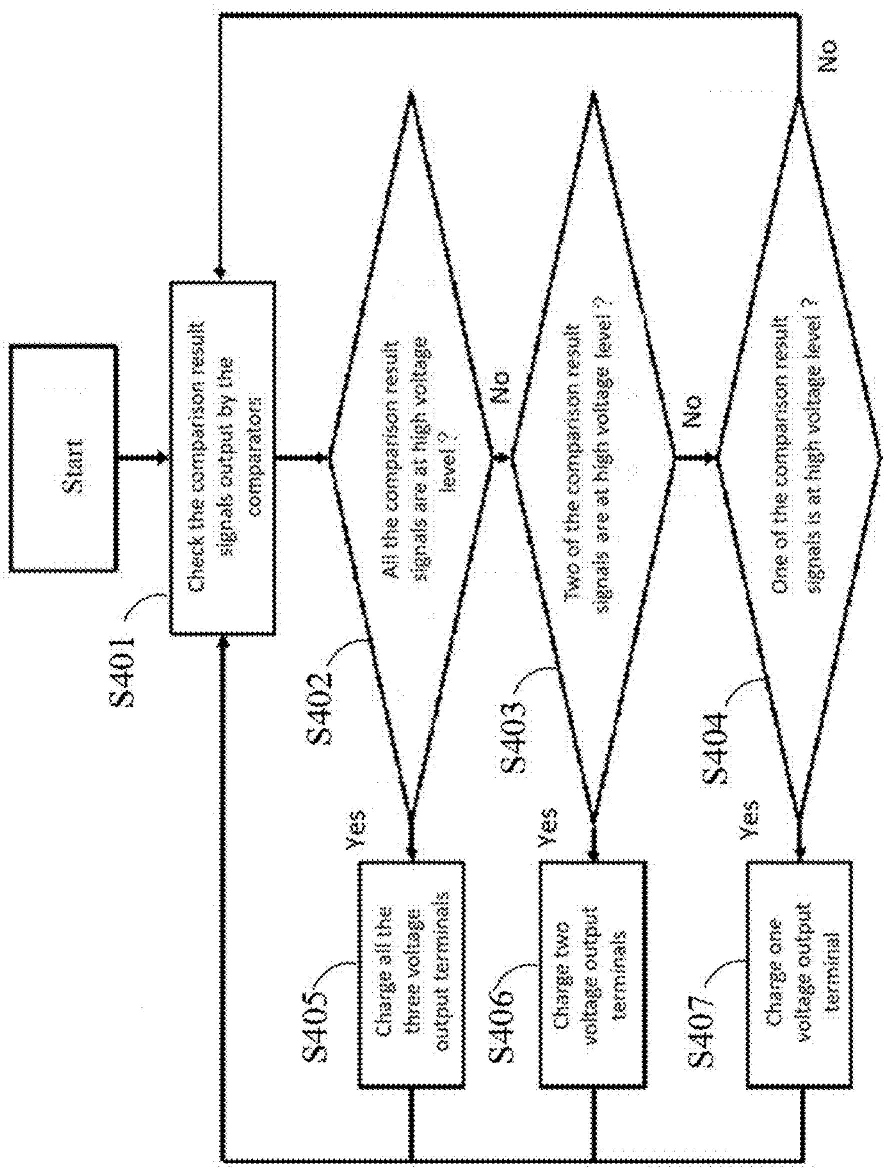
FIG. 4 is a flowchart illustrating a part of the charging method executed by the charging controller of the buck circuit according to an embodiment of the present invention.

Further, please refer to FIG. 1 and FIG. 4. FIG. 4 is a flowchart illustrating a part of the charging method executed by the charging controller of the buck circuit according to an embodiment of the present invention. In Step S401, the charging controller checks whether the comparison result signals CP1-CP3 output by the comparators CMP1-CMMP3 are at the high voltage level or low voltage level. In Step S402, it is determined whether all the comparison result signals CP1 to CP3 are at the high voltage level, if so, Step S403 will be executed; otherwise, and Step S405 will be executed. In Step S405, the charging controller determines to charge the three voltage output terminals. In Step S403, it is determined whether two of the comparison result signals CP1 to CP3 are at the high voltage level, if so, Step S404 will be executed; otherwise Step S406 will be executed. In Step S406, the charging controller determines to charge two voltage output terminals corresponding to two of the comparison result signals CP1-CP3 with the high voltage level. In Step S405, it is determined whether only one of the comparison result signals CP1 to CP3 is at the high voltage level, if so, Step S407 will be executed; otherwise, Step S401 will be executed. In Step S407, the charging controller determines to charge the voltage output terminal corresponding to one of the comparison result signals CP1-CP3 with the high voltage level.

Figure 5:
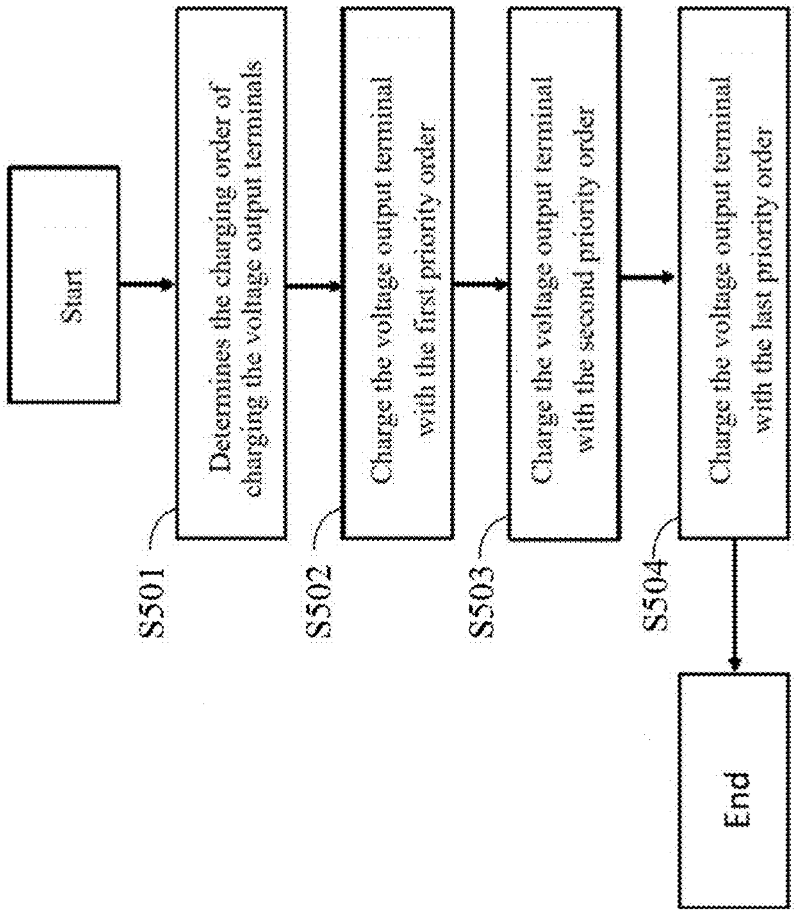
FIG. 5 is a flowchart illustrating another part of the charging method executed by the charging controller of the buck circuit according to an embodiment of the present invention.
Figure 6:
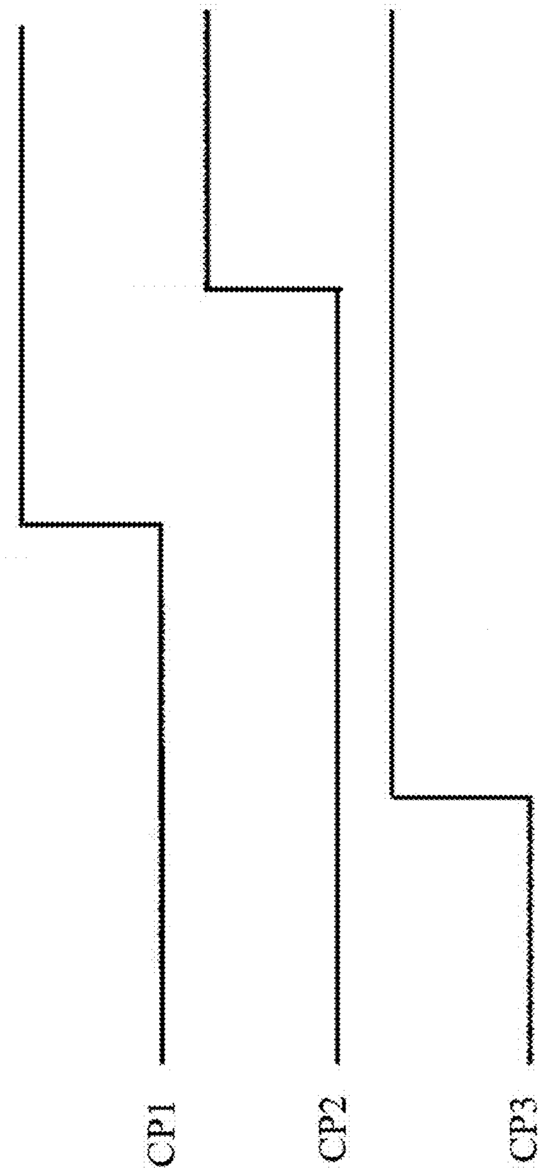
FIG. 6 is a signal waveform diagram illustrating a comparison result signal in the charging controller according to an embodiment of the present invention.

Please refer to FIGS. 1, 5 and 6. FIG. 5 is a flowchart illustrating another part of the charging method executed by the charging controller of the buck circuit according to an embodiment of the present invention. FIG. 6 is a signal waveform diagram illustrating a comparison result signal in the charging controller according to an embodiment of the present invention. In a period of time, when the feedback voltage VFB3 is lower than the reference voltage VREF, then the feedback voltage VFB1 is lower than the reference voltage VREF, and then the feedback voltage VFB2 is lower than the reference voltage VREF. In this way, as shown in FIG. 6, the comparison result signal CP3 in the charging controller changes from a low voltage level to a high voltage level, then the comparison result signal CP1 changes from the low voltage level to the high voltage level, and then the comparison result signal CP2 changes from the low voltage level to the high voltage level.

Thus, in Step S501 of FIG. 5, the charging controller determines the charging order, and the determined charging order is to charge the voltage output terminal of the output voltage VOUT3 first, then charge the voltage output terminal of the output voltage VOUT1, and then charge the voltage output terminal of the output voltage VOUT2. In other words, the charging controller determines the charging order by observing the priority order the comparison result signals CP1-CP3 at high voltage level turned from the low voltage level within a period of time, and determining the charging order according to the aforementioned priority order of turning from the low voltage level to the high voltage level.

In Steps S502-S504, the charging controller controls the pulse-frequency modulation buck module of the buck circuit to sequentially charge the voltage output terminal with the first priority order to the voltage output terminal with the third priority order, that is, sequentially charge the voltage output terminals of the output voltage VOUT3, the output voltage VOUT1 and the output voltage VOUT2. After Step S504, the process of charging is omitted. Please note that as mentioned above in each of Steps S502-S504, if the corresponding one of the output voltages VOUT1-VOUT3 at the voltage output terminal has been charged to a specific level, the current flowing through the single inductor L is zero, so that the pulse-frequency modulation buck unit 11 will output a zero-point current detection signal ZCD to indicate that the voltage output terminal being charged has been charged, and it is possible to go to the next charging step to charge the voltage output terminal with the next priority order.

Figure 7:
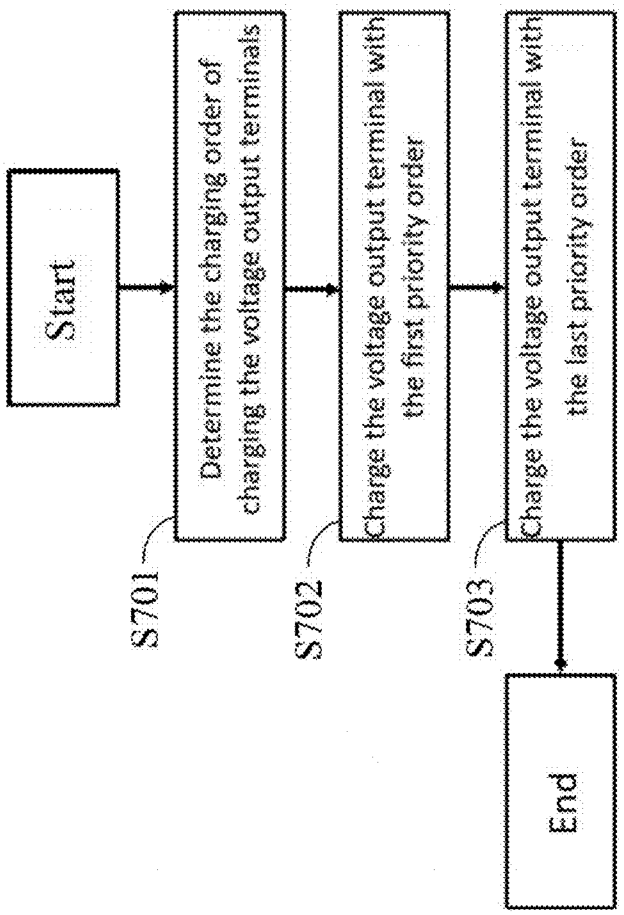
FIG. 7 is yet another flowchart illustrating another part of the charging method executed by the charging controller of the buck circuit according to an embodiment of the present invention.

Please refer to FIG. 1 and FIG. 7. FIG. 7 is yet another flowchart illustrating another part of the charging method executed by the charging controller of the buck circuit according to an embodiment of the present invention. In a period of time, when the feedback voltage VFB1 is lower than the reference voltage VREF and then the feedback voltage VFB3 is lower than the reference voltage VREF, and the feedback voltage VFB2 has never been lower than the reference voltage VREF, in Step S701 of FIG. 7, the charging controller will determine the charging order, and the determined charging order is to charge the voltage output terminal of the output voltage VOUT1 first, and then charge the voltage output terminal of the output voltage VOUT3.

In Steps S702 and S703, the charging controller controls the pulse-frequency modulation buck module of the buck circuit to sequentially charge the voltage output terminals with the first priority order and the second priority order, that is, sequentially charges the voltage output terminals of the output voltage VOUT1 and the output voltage VOUT3. After Step S703, the process of charging is omitted. Please note that as mentioned above, in each of Steps S702 and S703, if the corresponding one of the output voltages VOUT1 and VOUT3 of the voltage output terminal has been charged to a specific level, the current flowing through the single inductor L will be zero, so that the pulse-frequency modulation buck unit 11 will output a zero-point current detection signal ZCD to indicate that the charging voltage output terminal has been completed, and the flow can go to the next charging step to charge the voltage output terminal with the next priority order.

Figure 8:
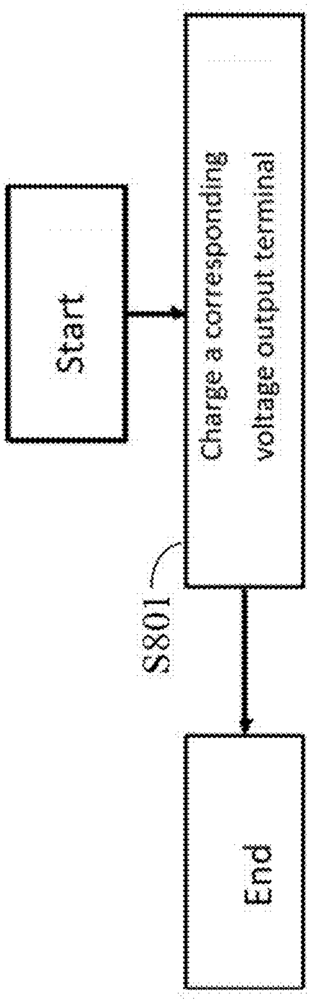
FIG. 8 is still another flowchart illustrating another part of the charging method executed by the charging controller of the buck circuit according to an embodiment of the present invention.

Please refer to FIG. 1 and FIG. 8. FIG. 8 is still another flowchart illustrating another part of the charging method executed by the charging controller of the buck circuit according to an embodiment of the present invention. In a period of time, if merely the feedback voltage VFB1 is lower than the reference voltage VREF, while the feedback voltages VFB2 and VFB3 are never lower than the reference voltage VREF, in Step S801 of FIG. 8, the charging controller determines the charging order, and the determined charging order is to charge the voltage output terminal of the output voltage VOUT1 first.

In Step S802, the charging controller controls the pulse-frequency modulation buck module of the buck circuit to charge the corresponding voltage output terminal, that is, the voltage output terminal of the output voltage VOUT1. After Step S802, the process of charging is omitted. Please note that as mentioned above, in Step S802, if the output voltage VOUT1 of the voltage output terminal has been charged to a specific level, the current flowing through the single inductor L will be zero, so that the pulse-frequency modulation buck unit 11 will output a zero-point current detection signal ZCD, to indicate that the charging voltage output terminal has been charged, and the charging process can be omitted.

The present invention is illustrated using preferred embodiments only, but it should be understood by anyone skilled in the art that the above-mentioned embodiments are only used to help describe the present invention, and are not meant to limit the claimed scope of the present invention. All modifications or substitutions equal or equivalent to the above embodiments should be interpreted as being included in the spirit or scope of the present invention. Therefore, the scope of the present invention should be based on what is defined in the claims.

What is claimed is:

1. A charging controller for a buck circuit, wherein the buck circuit comprises a pulse-frequency modulation buck module, a single inductor and a switch module, and the pulse-frequency modulation buck module outputs a plurality of output voltages to a plurality of voltage output terminals through the single inductor and a plurality of switches of the switch module, and the charging controller comprises:

a comparison module, configured to compare a reference voltage with a plurality of feedback voltages of the plurality of output voltages to generate a plurality of comparison result signals, wherein each of the plurality of switches is arranged between the single inductor and a corresponding one of the plurality of voltage output terminals; and a single-inductor multi-output control circuit, electrically connected to the comparison module, and configured to determine a charging order of the plurality of voltage output terminals based on the plurality of comparison result signals, and generate a plurality of switching signals for controlling the plurality of switches and a start signal for enabling the pulse-frequency modulation buck module to charge one of the plurality of voltage output terminals based on a zero-current detection signal of the single inductor and the charging order, wherein the single-inductor multi-output control circuit comprises:

a comparator-triggering detection circuit, configured to generate a plurality of charging quantity indication signals based on the plurality of comparison result signals, wherein the plurality of charging quantity indication signals are configured to indicate a quantity to be charged among the plurality of voltage output terminals;

a sequencing circuit, electrically connected to the comparator-triggering detection circuit and configured to determine the charging order based on the plurality of charging quantity indication signals and the plurality of comparison result signals; and a charging path control circuit, electrically connected with the sequencing circuit and configured to generate the plurality of switching signals based on the zero-current detection signal and the charging order.

2. The charging controller according to claim 1, wherein the plurality of voltage output terminals comprises a first voltage output terminal, a second voltage output terminal, and a third voltage output terminal, and the plurality of comparison result signals are respectively generated by comparing a first feedback voltage of the first voltage output terminal, a second feedback voltage of the second voltage output terminal and a third feedback voltage of the third voltage output terminal with the reference voltage.

3. The charging controller of claim 2, wherein when the first feedback voltage is lower than the reference voltage and the second feedback voltage is lower than the reference voltage and the third feedback voltage is lower than the reference voltage, the charging order is to charge the first voltage output terminal, the second voltage output terminal and the third voltage output terminal in sequence;

wherein the plurality of switch signals generated by the single-inductor multi-output control circuit turn on a first switch corresponding to the first voltage output terminal to charge the first voltage output terminal, and when the zero-current detection signal of the single inductor is received, the plurality of switch signals generated by the single-inductor multi-output control circuit turn off the first switch and then turn on a second switch corresponding to the second voltage output terminal to charge the second voltage output terminal, and when the zero-current detection signal of the single inductor is received, the plurality of switch signals generated by the single-inductor multi-output control circuit turn off the second switch, and then turn on a third switch corresponding to the third voltage output terminal to charge the third voltage output terminal, and when the zero-current detection signal of the single inductor is received, the plurality of switch signals generated by the single inductance multi-output control circuit turn off the third switch and the generated start signal disables the pulse-frequency modulation buck module in order to perform charging.

4. The charging controller of claim 2, wherein when the first feedback voltage is lower than the reference voltage first and then the second feedback voltage is lower than the reference voltage, the charging order is to charge the first voltage output terminal and the second voltage output terminal in sequence;

wherein the plurality of switch signals generated by the single-inductor multi-output control circuit turn on a first switch corresponding to the first voltage output terminal to charge the first voltage output terminal, and then turn off the first switch when the zero-current detection signal of the single inductor is received, and then turn on a second switch corresponding to the second voltage output terminal to charge the second voltage output terminal, and when the zero-current detection signal of the single inductor is received, the plurality of switch signals generated by the single-inductor multi-output control circuit turn off the second switch, and the generated start signal disables the pulse-frequency modulation buck module from charging.

5. The charging controller according to claim 2, wherein when there is only the first feedback voltage being smaller than the reference voltage, the charging order is to charge only the first voltage output terminal;

wherein the plurality of switch signals generated by the single-inductor multi-output control circuit turn on a first switch corresponding to the first voltage output terminal to charge the first voltage output terminal, and then when the zero-current detection signal of the single inductor is received, the plurality of switch signals generated by the single-inductor multi-output control circuit turn off the first switch, and the generated start signal disables the pulse-frequency modulation buck module from charging.

6. The charging controller of claim 1, wherein the comparison module comprises a plurality of comparators, wherein forward input terminals of the plurality of comparators receive the reference voltage, and reverse input terminals of the plurality of comparators receive the plurality of feedback voltages.

7. A buck circuit comprising:

a charging controller according to claim 1;

a pulse-frequency modulation buck module;

a plurality of voltage output terminals;

a single inductor;

a switch module, comprising a plurality of switches, wherein one end of each of the plurality of switches is electrically connected to a first end of the single inductor, the other end of each of the plurality of switches is electrically connected to a corresponding one of the plurality of voltage output terminal, and a control end of each of the plurality of switches is electrically connected to the single-inductor multi-output control circuit to receive a corresponding switching signal of the plurality of switching signals; and the pulse-frequency modulation buck module comprises:

a pulse-frequency modulation buck unit, electrically connected to the single-inductor multi-output control circuit and configured to receive the start signal and output the zero-current detection signal, a first driving signal and a second driving signal; and a power switch circuit, comprising a PMOS power transistor and an NMOS power transistor, wherein a gate of the PMOS power transistor and a gate of the NMOS power transistor are electrically connected with the pulse-frequency modulation buck unit to receive the first driving signal and the second driving signal respectively, and drains of the PMOS power transistor and the NMOS power transistor are electrically connected with each other; and a source of the PMOS power transistor and a source of the NMOS power transistor are electrically connected with a first voltage and a second voltage, respectively.

8. The buck circuit as claimed in claim 7, wherein the pulse-frequency modulation buck unit has an enable terminal configured to receive the start signal, and the pulse-frequency modulation buck unit comprises:

a comparator, configured to compare one of the plurality of feedback voltages with the reference voltage to generate another comparison result signal;

a fixed peak-voltage control circuit, electrically connected to the comparator and configured to generate a third driving signal based on the zero-current detection signal and a peak-current detection signal of the single inductor;

a first driving stage and a second driving stage, electrically connected to the fixed peak-voltage control circuit and configured to generate the first driving signal and the second driving signal respectively based on the third driving signal;

a zero-current comparator and a peak-current comparator, electrically connected to the single inductor and the fixed peak-voltage control circuit, respectively, and configured to detect a current flowing through the single inductor to generate the zero-current detection signal and the peak-current detection signal.

9. A charging control method for a buck circuit, comprising:

comparing a reference voltage with a plurality of feedback voltages of a plurality of output voltages outputted to a plurality of voltage output terminals through ana single inductor and a plurality of switches, to generate a plurality of comparison result signals, wherein each of the plurality of switches is arranged between the single inductor and the corresponding voltage output terminal;

generating a plurality of charging quantity indication signals based on the plurality of comparison result signals, wherein the plurality of charging quantity indication signals indicate a quantity of voltage output terminals to be charged among the plurality of voltage output terminals;

determining a charging order of the plurality of voltage output terminals based on the plurality of charging quantity indication signals and the plurality of comparison result signals, and generating a plurality of switching signals for controlling the plurality of switches and a start signal for enabling a pulse-frequency modulation buck module to charge one of the plurality of voltage output terminals based on a zero-current detection signal of the single inductor and the charging order.

* * * * *